United States Patent
Francavilla et al.

(10) Patent No.: US 9,625,744 B2
(45) Date of Patent: Apr. 18, 2017

(54) CONTACT LENS CLEANING SYSTEM WITH INSULATION

(71) Applicant: NovaBay Pharmaceuticals, Inc., Emeryville, CA (US)

(72) Inventors: Charles Francavilla, Emeryville, CA (US); David Stroman, Emeryville, CA (US)

(73) Assignee: NovaBay Pharmaceuticals, Inc., Emeryville, CA (US)

( * ) Notice: Subject to any disclaimer, the term of this patent is extended or adjusted under 35 U.S.C. 154(b) by 0 days.

(21) Appl. No.: 14/530,528

(22) Filed: Oct. 31, 2014

(65) Prior Publication Data

US 2015/0118108 A1  Apr. 30, 2015

Related U.S. Application Data

(60) Provisional application No. 61/897,978, filed on Oct. 31, 2013.

(51) Int. Cl.
  *G02C 13/00*  (2006.01)
(52) U.S. Cl.
  CPC .................. *G02C 13/008* (2013.01)
(58) Field of Classification Search
  CPC ..................................................... G02C 13/08
  See application file for complete search history.

(56) References Cited

U.S. PATENT DOCUMENTS

| 2,409,073 A | 10/1946 | Sias et al. |
| 2,985,949 A | 5/1961 | Rice |
| 3,871,395 A * | 3/1975 | Murry .................. A45C 11/005 134/107 |
| 3,912,451 A | 10/1975 | Gaglia, Jr. |

(Continued)

FOREIGN PATENT DOCUMENTS

| EP | 1038536 | 9/2000 |
| TW | GB 2297391 A * | 7/1996 ............. A61L 12/04 |

(Continued)

OTHER PUBLICATIONS

Martin et al.; Measurement of the temperature profile of an exothermic autocatalytic reaction front; Phys Rev E; 80; pp. (055101R)1-4; Nov. 19, 2009.

(Continued)

*Primary Examiner* — Regina M Yoo

(57) ABSTRACT

The present invention relates generally to systems and methods for cleaning and disinfecting contact lenses. In various respects, the invention is directed to an insulated system that reduces heat loss from catalyzed neutralization of a disinfecting solution resulting in an increased temperature of the disinfection solution during the disinfection process and neutralization of the disinfection solution. The increased temperature increases the kill rate (i.e., better reduction) of microorganisms present on the lenses, and increases the neutralization rate of the disinfection solution. Increase of the kill rate allows better reduction of microorganisms resistant to elimination using previous systems and methods, (e.g., *Acanthamoeba* cysts), and decreases the amount of time as compared to previous systems and methods necessary to reduce microorganisms to acceptable levels.

16 Claims, 14 Drawing Sheets

(56) References Cited

U.S. PATENT DOCUMENTS

| | | | |
|---|---|---|---|
| 3,942,981 A | 3/1976 | Sato | |
| 4,186,392 A | 1/1980 | Holz | |
| 4,395,139 A | 7/1983 | Namiki et al. | |
| 4,588,307 A | 5/1986 | Palti | |
| 4,636,091 A | 1/1987 | Pompei et al. | |
| 4,637,919 A | 1/1987 | Ryder et al. | |
| 4,687,997 A | 8/1987 | Tao | |
| 4,736,191 A | 4/1988 | Matzke et al. | |
| 4,750,610 A | 6/1988 | Ryder | |
| 4,784,149 A | 11/1988 | Berman et al. | |
| 4,797,840 A | 1/1989 | Fraden | |
| 4,993,419 A | 2/1991 | Pompei et al. | |
| 5,012,813 A | 5/1991 | Pompei et al. | |
| 5,082,558 A | 1/1992 | Burris | |
| 5,129,999 A | 7/1992 | Holland et al. | |
| 5,145,323 A | 9/1992 | Farr | |
| 5,184,633 A | 2/1993 | Langford | |
| 5,186,317 A | 2/1993 | Ryder et al. | |
| 5,196,174 A | 3/1993 | Cerola et al. | |
| 5,238,369 A | 8/1993 | Farr | |
| 5,275,784 A * | 1/1994 | Perlaky | A61L 12/128 134/901 |
| 5,280,834 A | 1/1994 | Berkley | |
| 5,302,345 A | 4/1994 | Oksman et al. | |
| 5,328,597 A | 7/1994 | Boldt et al. | |
| 5,366,078 A | 11/1994 | Baun | |
| 5,505,349 A | 4/1996 | Peckels | |
| 5,518,591 A | 5/1996 | Pulliainen et al. | |
| 5,558,846 A | 9/1996 | Alvord et al. | |
| 5,609,284 A | 3/1997 | Kondratenko | |
| 5,650,597 A | 7/1997 | Redmahyne | |
| 5,653,238 A | 8/1997 | Pompei | |
| 5,673,152 A * | 9/1997 | Yokota | G11B 7/0935 359/813 |
| 5,699,900 A | 12/1997 | Artis | |
| 5,806,708 A * | 9/1998 | Schwab | A45C 11/008 220/378 |
| 6,148,992 A | 11/2000 | Kanner et al. | |
| 6,183,705 B1 | 2/2001 | Chang | |
| 6,343,399 B1 * | 2/2002 | Pankow | A45C 11/005 15/104.92 |
| 6,653,842 B2 | 11/2003 | Mosley et al. | |
| 6,939,487 B1 * | 9/2005 | Ajello | B29C 37/0003 264/2.6 |
| 7,682,269 B1 | 3/2010 | Gait | |
| 8,603,252 B2 | 12/2013 | Dimeo et al. | |
| 2006/0070956 A1 | 4/2006 | Herrmann et al. | |
| 2007/0284263 A1 | 12/2007 | Giardina et al. | |
| 2008/0179200 A1 | 7/2008 | O'Hara et al. | |
| 2009/0211925 A1 | 8/2009 | Doniga | |
| 2010/0093019 A1 | 4/2010 | Ditcham et al. | |
| 2010/0259719 A1 | 10/2010 | Sabeta | |
| 2011/0028807 A1 | 2/2011 | Abreu | |
| 2012/0211027 A1 * | 8/2012 | Francavilla | A61L 12/128 134/18 |
| 2012/0222977 A1 * | 9/2012 | Elenes | B65D 25/287 206/316.1 |

FOREIGN PATENT DOCUMENTS

| | | |
|---|---|---|
| WO | WO 93/13409 | 7/1993 |
| WO | WO 94/26432 | 11/1994 |
| WO | WO 2013/056165 | 4/2013 |

OTHER PUBLICATIONS

Hughes R. and Kilibington S.; Comparison of Hydrogen Peroxide Contact Lens Disinfection Systems and Solutions against *Acanthamoeba* polyhpga; Antimicrobial Agents and Chemotherapy, Jul. 2001 pp. 2038-2043.

PCT Written Opinion of the ISA PCT/US2012/026249.

PCT Written Opinion of the ISA PCT/US14/63579.

\* cited by examiner

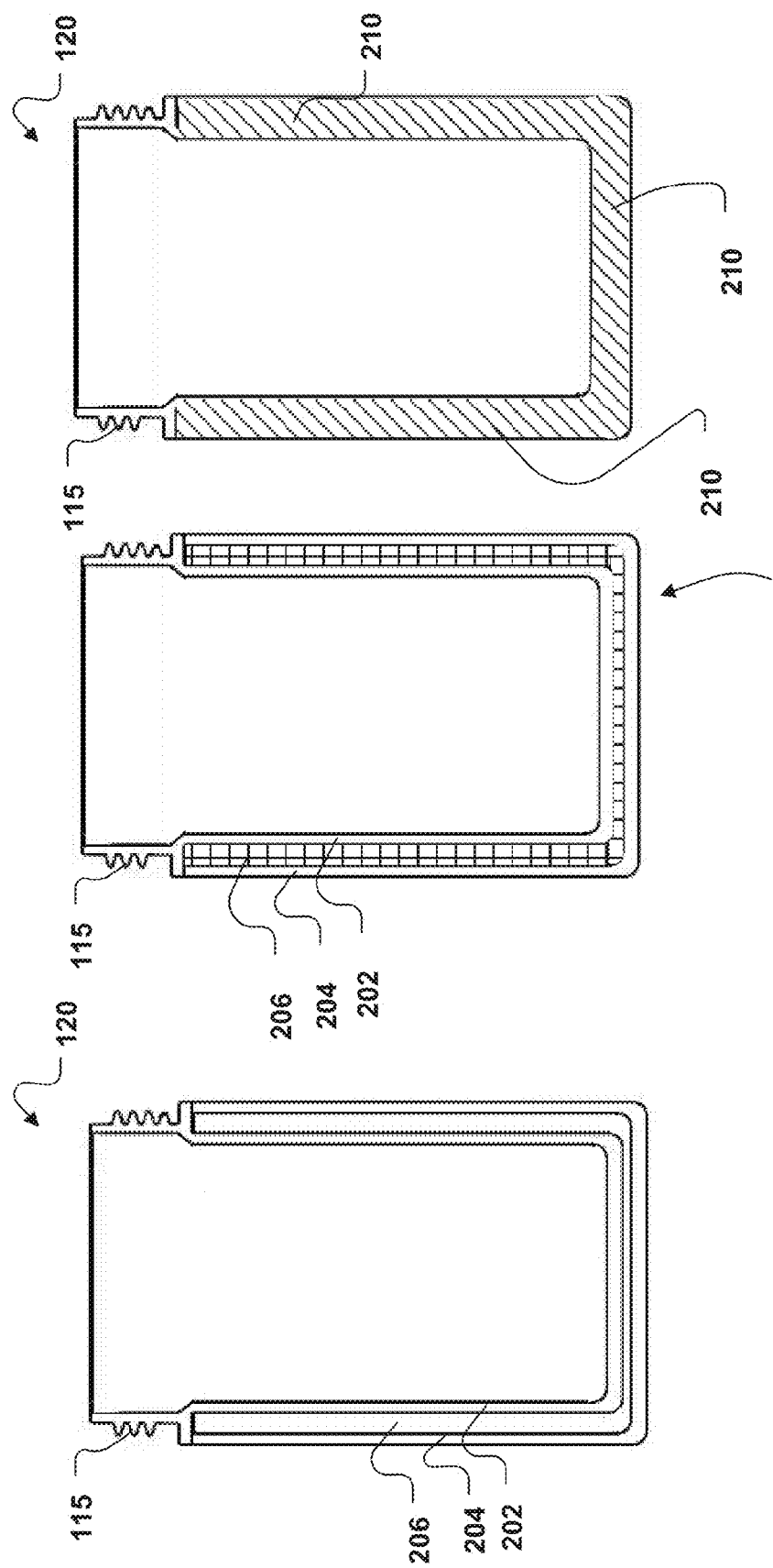

CONTACT LENS CLEANING SYSTEM WITH INSULATION

CROSS REFERENCE TO RELATED APPLICATIONS

The present application claims the benefit of U.S. Provisional Application No. 61/897,978, filed on Oct. 31, 2013, which is hereby incorporated by reference herein in its entirety.

INCORPORATION BY REFERENCE

All publications and patent applications mentioned in this specification are herein incorporated by reference to the same extent as if each individual publication or patent application was specifically and individually indicated to be incorporated by reference.

FIELD

The present invention relates generally to systems and methods for cleaning and disinfecting contact lenses. In various respects, the invention is directed to an insulated system that reduces heat loss from catalyzed neutralization of a disinfecting solution resulting in an increased temperature of the disinfection solution during the disinfection process and neutralization of the disinfection solution. The increased temperature increases the kill rate (i.e., better reduction) of microorganisms present on the lenses, and increases the neutralization rate of the disinfection solution. Increase of the kill rate allows better reduction of microorganisms resistant to elimination using previous systems and methods, and decreases the amount of time as compared to previous systems and methods necessary to reduce microorganisms to acceptable levels.

BACKGROUND

There are two major classes of contact lens disinfection systems: multipurpose disinfecting solutions (MPDS) and hydrogen peroxide systems. Hydrogen peroxide-based systems are often preferred, due to its better kill of bacteria, yeast, and fungi,preservative-free packaging, low user sensitivity to the active disinfection agent, and neutralization of the disinfection agent to natural by-products, e.g., water and oxygen.

Literature studies have shown that the contact lens surface typically harbors scores of different microbial species and viruses at the end of a wearing cycle. Of course, the specific species (and numbers of isolates of each species) vary from individual to individual and even between the two eyes. To standardize disinfection testing, the FDA (and industry) have adopted two types of testing; the "stand alone" test and the "regime" test. These two tests use strains of 3 bacterial species (*Staphylococcus aureus, Pseudomonas aeruginosa,* and *Serratia marcesens*) and a strain of *Candida albicans* and *Fusarium solani*. A minimum reduction in CFU at the end of disinfection time must be achieved for "adequate" disinfection to pass the regulatory test. All approved disinfection systems, including both one-step or two-step hydrogen peroxide systems (described further below), must pass these criteria. More complete killing during the disinfection process of troublesome microorganisms, e.g., yeast, fungi, and amoeba, will provide the consumer a reduced chance of infection (better safety) due to these micro-organisms.

Two common peroxide disinfection processes exist, so-called one-step and two-step peroxide systems, where the primary difference lies in when the catalyst is introduced into the peroxide solution. In a one-step peroxide system, the catalyst and peroxide are introduced at roughly the same time, whereas in the two-step system the catalyst is introduced much later—towards the end of a disinfection phase, i.e., well after the peroxide is introduced. The two-step system may more completely disinfect, i.e., has a greater kill rate because full strength hydrogen peroxide is present for much longer period of time, but requires the second step of introducing the catalyst to neutralize peroxide to a safe level, and the additional time necessary for neutralization. An additional draw back of the two-step system is a user may forget to introduce the catalyst, and accidently insert a lens with significant amounts of peroxide leading to increased discomfort and potential injury. The one-step system has the benefit of disinfecting and neutralizing at the same time, shortening the time needed before wearing the lenses and removing the potential of forgetting to introduce the catalyst. However, the one-step system does not have as high a kill rate as the two-step system because the one-step system, by design, immediately begins neutralizing the hydrogen peroxide, reducing capacity, over time, to kill bacteria, fungi, and or amoeba. One-step systems effectively reduce fungal microorganisms (e.g., *C. albicans* and *A. brasiliensis*) much greater than the acceptable level (e.g, ≥1-log kill); however, they may not as effectively reduce other microorganisms (e.g., *Acanthamoeba*), though there are no standardized acceptable levels at this time. The one-step hydrogen peroxide system is widely used as a lens disinfecting system today, and preferred by many users because of its superior killing efficacy as compared to non-hydrogen peroxide systems. Additional information can be found in C. Hildebrandt, D. Wagner, T. Kohlmann and A Kramer, In vitro analysis of the microbicidal activity of 6 contact lens care solutions, BMC Infectious Diseases 2012 12:241-253.

SUMMARY OF THE DISCLOSURE

The present invention uses a one-step hydrogen peroxide disinfection system and method for soft (hydrophilic) and rigid gas permeable contact lenses that achieves a higher kill rate for known microorganisms than previous one-step systems. Embodiments of the inventive system and methods use a thermally insulated vial to retain the heat of peroxide neutralization, elevating the temperature of the peroxide solution and maintaining an elevated temperature. The elevated temperature has at least the dual benefit of increasing the kill rate of microorganisms, and increasing the rate of neutralization. In alternative embodiments, a heating element may be provided either with or without the thermally insulated vial, where the heating element is used, in addition to the heat from the exothermic peroxide neutralization, to elevate and maintain an elevated temperature.

The following embodiments, aspects and variations thereof are exemplary and illustrative are not intended to be limiting in scope. A thermally insulated contact lens disinfection system may have a lens holder, a thermally insulated vial for receiving peroxide solution, catalyst, and lenses. The thermal insulation may take the form of a void between dual walls from which the vial is constructed, where the void may be under vacuum to reduce thermal conductivity, which may also be occupied, partially or fully, by an insulating material to further reduce the thermal conductivity. Vacuum pressures may be in the range of 0.0001 torr to 1 torr or more preferably 0.1 torr-1 torr. In some embodiments the gas in the void, whether or not partially occupied by insulating material, may be a gas having a thermal conductivity less than that of air (e.g., Ar, Kr or Xe) and could be a mixture of any of these gases with air. In alternative embodiments the vial is constructed directly from suitable thermally insulating materials (without the dual walled structure and insulating void), examples of which may include polystyrene, polypropylene, poly(styrene butadiene), poly(acrylonitrile butadiene styrene), polypropylene, or poly(methyl methacrylate). Preferably the selected thermally insulating material has a thermal conductivity between 0.0001 W/mK-0.05 W/mK, or more preferably 0.003 W/m-K-0.05 W/m-K.

Additional embodiments of the present invention include one or more method for disinfecting contact lenses. Lenses are placed in or on a contact lens basket, which is then received into a thermally insulated vial into which disinfection solution and a catalyst are added. The thermal insulation retains heat of the exothermic neutralization reaction. The thermal insulation may comprise materials and structured as described above.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

FIGS. 2A-2C illustrate side views of exemplary thermally insulated vials.

DETAILED DESCRIPTION

Figure 1A:
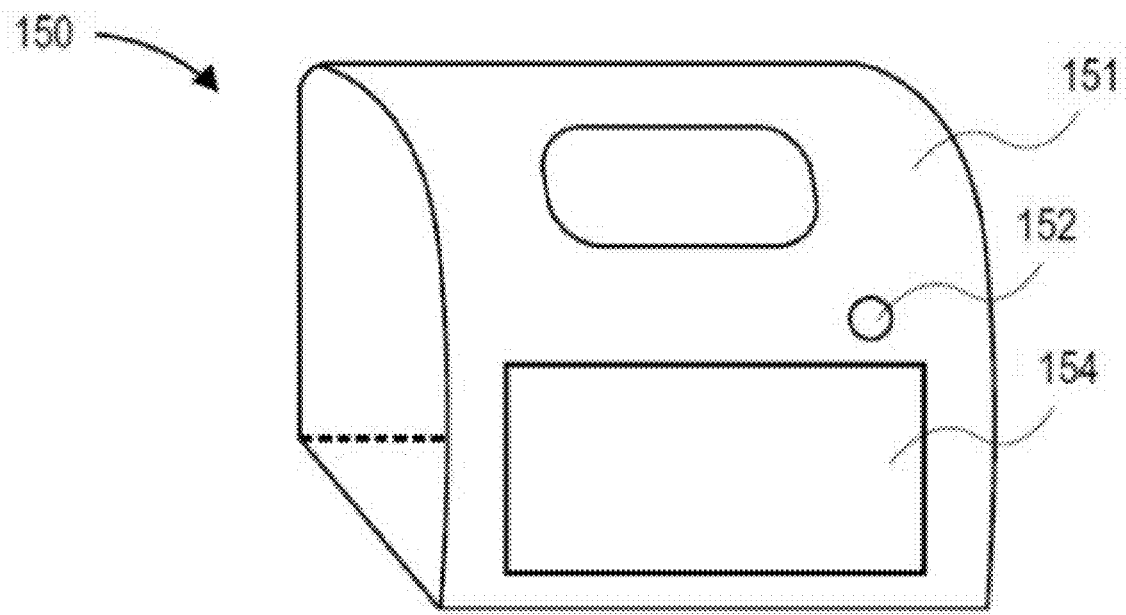
FIGS. 1A-1B illustrate a frontal view a caddy, side view of a cleaning case and a cross section of an insulated vial in accordance with an exemplary contact lens storage system.

Examples of prior art disinfecting cases including a cap and a vial are well known in the literature and may include other features not shown herein. Examples of such cases can be found in U.S. Pat. Nos. 4,637,919, 4,750,610, 5,186,317, 5,366,078, 5,558,846, 5,609,284, 5,609,837, and 6,148,992. Commercial examples of such cases are found in or included as parts of the AOSEPT® Disposable Cup & Disc (CIBA VISION®) and CLEAR CARE® (CIBA VISION®) systems.

The present invention uses a one-step hydrogen peroxide disinfection system and method for disinfecting soft (hydrophilic) and rigid gas permeable contact lenses, where the inventive system and method achieves higher kill rates for bacteria, yeast, fungi and amoeba at low concentrations of hydrogen peroxide (e.g., 1%-10%, more preferably 3%-7%) than previous one-step systems and methods. Embodiments of the inventive system and methods use a thermally insulated vial to retain the heat of the exothermic neutralization of peroxide, thereby elevating the temperature of and maintaining an elevated temperature of the peroxide disinfecting solution. The elevated temperature has the benefit of increasing the rate of kill of microorganisms, and simultaneously accelerating the neutralizing of the peroxide solution. A further benefit of embodiments of the present invention is the use of the simpler and quicker one-step system with its associated benefits over a two-step system. In alternative embodiments a heating element is provided to assist in elevating of and maintaining the elevated temperature of the disinfection solution to a desired level, whether the thermally insulated vial is present or not.

The inventive system and method, in accordance with some embodiments, includes a cap and thermally insulated vial. The thermally insulated vial, in accordance to some embodiments, may include a void or space between a double wall structure, or, alternatively, the material from which the vial wall is constructed has thermal insulating properties, or, alternatively, a combination of a void and thermally insulating material may be used, for example in a sandwich structure. For embodiments using the void to provide thermal insulation, the void may be a substantially evacuated space, contain a gas with a thermal conductivity less than air (e.g., Ar, Kr, and Xe) or a combination of low thermal conductivity gases, which combination may include air, which mixture may also be at reduced or vacuum pressures (e.g., 0.0001 torr-1.5 torr, or more preferably 0.1 torr-1 torr). Alternatively, the material from which the vial is made may have thermal insulating properties (e.g., neoprene rubber, silica aerogel, expanded polystyrene, polyurethane foam, fiberglass, mineral wool). As another alternative a heating element may also be provided, either with a non-insulated vial or with the insulated vial.

The term "caddy" refers to an apparatus adapted for use with a disinfection solution used to disinfect a medical device, e.g., contact lenses for example. A caddy may be an apparatus into or onto which a separate thermally insulated vial may be removably placed. In other embodiments, a caddy may also be the cleaning vessel (which is thermally insulated).

The term "disinfection solution" refers to any liquid cleaning or disinfecting solution used to clean medical devices such as contact lenses. Disinfecting solutions may include hydrogen peroxide or other peroxide compounds. Disinfection solutions may also include other ingredients as known to the skilled artisan. Examples of cleaning solutions which may be used in accordance with the systems described herein include, without limitation, AOSEPT® Disinfectant (CIBA VISION®) and CLEAR CARE® (CIBA VISION®).

The term or "disinfection system" refers to a disinfection solution and accompanying devices, such as a catalyst or other substance used to neutralize the disinfection solution.

The term "cleaning case" refers to a vial in combination with a cap, a basket in which lenses may be held, and a catalyst or other substance, as more fully explained herein.

The term "vial" refers to a receptacle for the disinfecting solution, lenses and catalyst or other substance.

The term "catalyst" refers to a substance that accelerates the neutralization of the disinfection solution. Examples of catalysts, without limitation, include platinum or enzymes such as catalase. As referred to above, it may also be a substance that assists in the chemical reaction transforming the disinfection solution to something substantially benign when placed in a user's eye.

The term "property" refers to a physical, chemical, electrical, optical, or other property, as well as a profile of that property over time.

Unless specifically noted otherwise herein, the definitions of the terms used are standard definitions used in the art of organic synthesis, pharmaceutical, and ocular sciences. Exemplary embodiments, aspects and variations are illustrated in the figures and drawings, and it is intended that the embodiments, aspects and variations, and the figures and drawings disclosed herein are to be considered illustrative and not limiting.

Figure 1B:
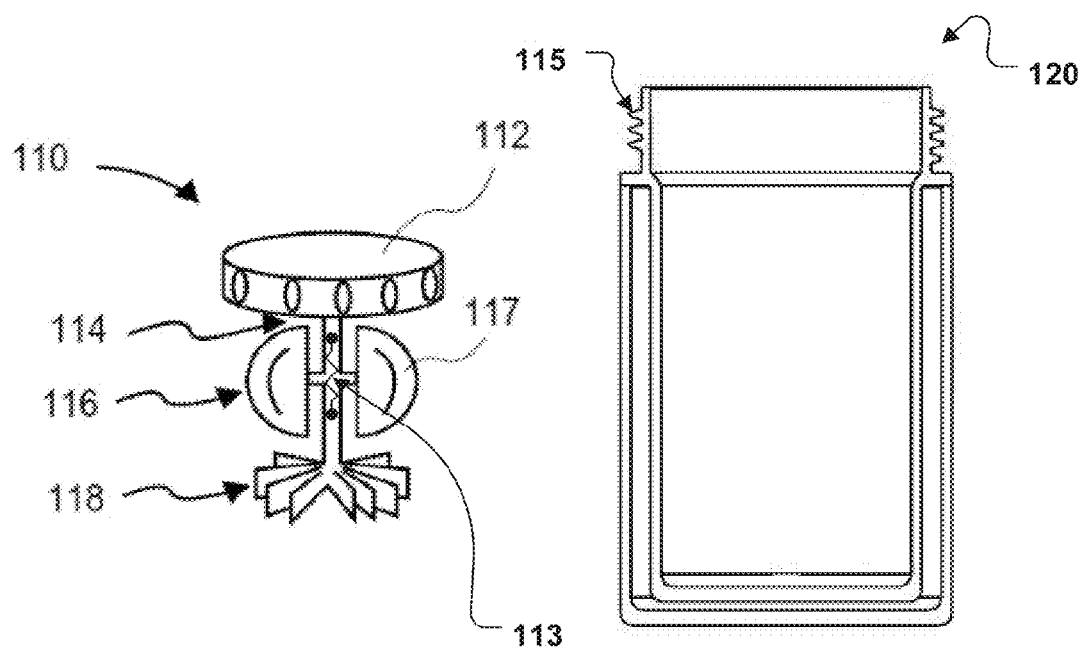

FIGS. 1A-B show caddy 150 and cleaning case 110. Referring to FIG. 1A, caddy 150 comprises caddy case 151, indicator 152, and display panel 154. Caddy case 151 may be made out of an appropriate material, e.g., a plastic or similar type of material, which is well known in the art. Indicator 152 may be a light or an LED (light emitting diode), and display panel may be an LCD (liquid crystal display) or a similar display panel capable of displaying text and/or graphical images either in color or black/white/grayscale. A display may be an indicator such as a light or an LED or a display panel such as an LCD. These components and structures are also well known in the art.

In some embodiments, caddy 150 may include a mechanism for providing an audio indication of the solution status, temperature monitoring, and other information. For example, caddy case may include one or more speakers and a controller or processor. The one or more speakers may output audio from an acoustic signal provided by the controller or processor. The controller or processor may receive temperature or other data from one or more sensors. An audio message may be provided based on the data provided by the sensors. For example, the caddy 150 may provide an audio alert indicating the time remaining in the neutralization process, the neutralization process is complete, the caddy is disinfecting the contact lens, disinfection was successful or unsuccessful, the solution is not detected and other messages. Hence, embodiments of the present invention may provide audio alerts in place of or in addition to visual or active alerts to communicate events or conditions related to contact lens, the disinfection solution, and other aspects of the present technology.

Referring to FIG. 1B, a separate and partially disassembled cleaning case 110 is shown. Cleaning case 110 may comprise such elements as cap 112, support beam 114, basket 116 and catalyst 118, and thermally insulated vial 120. In an alternative embodiment cleaning case 110 may also include heating element 113, which embodiment may include thermally insulated vial 120 or a vial without thermal insulation. Heating element 113 is shown located on beam 114, but can be placed anywhere (including somewhere in or on the vial) so long as it is immersed in the disinfection solution and wired to a power source, as will be appreciated by the skilled artisan. Contact lenses 117 are also shown. Cleaning case 110 may be fully assembled by reversibly affixing (e.g., by screwing, snapping, form-fitting, friction fitting, etc.) cap 112 onto thermally insulated vial 120. Thermally insulated vial 120 of the embodiment illustrated in FIG. 1B includes threads 115 for affixing cap 112, but other mechanisms for securing cap 112 will be appreciated by the skilled artisan. Once fully assembled (lenses, disinfection solution, catalyst, cap, etc.), the cleaning case may be removably placed in or on the caddy, or alternatively set on its own.

Referring to FIG. 2A-2C embodiments of thermally insulated vial 120 are shown. In FIG. 2A vial 120 has a double wall structure, comprised of inner wall 202, outer wall 204 and thermally insulating void 206. Threads 203 or other appropriate attachment mechanisms are provided to secure cap 112 to thermally insulated vial 120. Thermally insulated void 206 provides the primary thermal insulation for vial 120 in this embodiment. Thermally insulated void 206 has a thermal conductivity less than that of air, which is 26.2 mW/m-K (milliwats per meter kelvin) at ~300 K, and is, in this embodiment, substantially devoid of solid thermal insulating material. For example, and not by way of limitation, thermally insulated void may comprise one or more gases of low thermal conductivity, such as and not by way of limitation argon, xenon, and krypton. Alternatively, the void may be evacuated to a low pressure of gas, whether air, argon, xenon krypton, other suitable gas or a mixture of gases. Materials used to construct inner and outer walls may also have thermal insulation properties (i.e., low thermal conductivities by virtue of the material, thickness or both), for example and not by way of limitation plastics and glass polystyrene, poly(styrene butadiene), poly(acrylonitrile butadiene styrene), polypropylene, polyethylene, poly(methyl methacrylate).

Referring to FIG. 2B, showing another embodiment, void 206 may also comprise insulation material 208, such as and not by way of limitation highly porous material (e.g., fumed silica, aerogel, perlite or glass fiber), where inner wall 202, outer wall 206 and insulation material 208 form a sandwich structure. Preferably, in this embodiment, void 206 is substantially or partially evacuated of gas (e.g., 0.0001 torr-1.5 torr, or more preferably 0.1 torr-1 torr), where the gas may comprise, for example, those listed above or a mixture thereof. Heat transfer through a volume (e.g., void 206) occurs by convection, conduction, and radiation. Reducing gas pressure will substantially reduce or eliminate convection since convection relies on the presence of gas molecules transferring energy by bulk movement through the void. Reduced pressure also reduces conduction as fewer collisions occur between adjacent gas molecules or the walls of the insulation vessel. However, tighter dimensions of the vial walls will cause a relative increase in the conduction component because smaller distances between the walls will increase the number of collisions of gas molecules with the walls. Conduction is more substantially reduced in reduced pressure environments when combined with the presence of solid insulation material in the void, i.e., an evacuated insulation sandwich. The alternative of sandwiching solid insulation material in the void in reduced pressure will substantially reduce the thermal conductivity, without the need of increasing the spacing between the walls. The skilled artisan will appreciate that solid insulation material 208, if used, may off-gas under reduced pressures, in which case one may use a "getter", i.e. a chemical in the void to collect or bind the gas from the off-gassing. Examples of thermally insulating materials for the sandwich structure include, without limitation, neoprene rubber, silica aerogel, expanded polystyrene, polyurethane foam, fiberglass, or mineral wool. The materials may be included in the sandwich structure at atmospheric pressures or reduced pressures.

Referring to FIG. 2C, showing another embodiment of thermally insulated vial 120, wall(s) 210 are made from a thermally insulated and sufficiently structurally sound material. Thermally insulated vial 120 is preferably intended for a contact lens disinfection system, using peroxide as the disinfectant. Thus, the thermal insulating material must withstand prolonged exposure to peroxide based lens disinfecting solutions, and be able to withstand the rigors of normal use (e.g., dropping, banging etc.) of a contact disinfection system. In addition the thermal insulating material should have sufficiently low thermal conductivity (e.g., ranging from 0.0001 to 0.05 W/m-K, or alternatively 0.003-0.05 W/m-K) at thicknesses between 1-10 mm in order to achieve desired heat retention from the exothermic neutralization of peroxide and maintain an elevated temperature in thermally insulated vial 120 to increase the kill rate of harmful microorganisms as described herein. Some examples of suitable thermally insulating material include: polystyrene, poly(styrene butadiene), poly(acrylonitrile butadiene styrene), polypropylene, polyethylene, poly(methyl methacrylate).

Figure 3A:
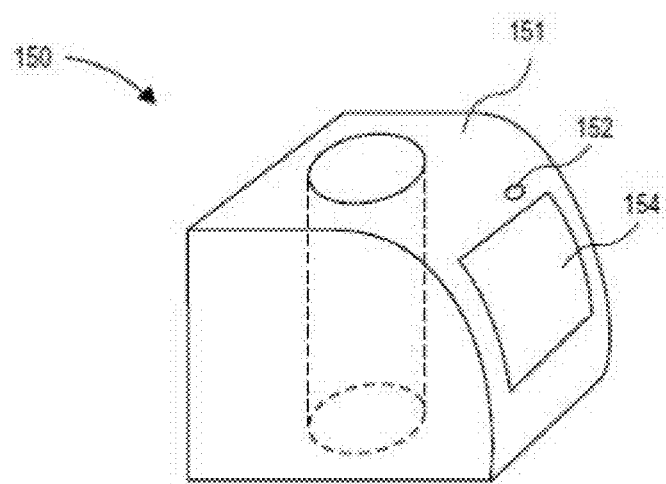
FIGS. 3A-B illustrate a side view and a cross sectional side view of a caddy in accordance with another exemplary contact lens storage system.
Figure 3B:
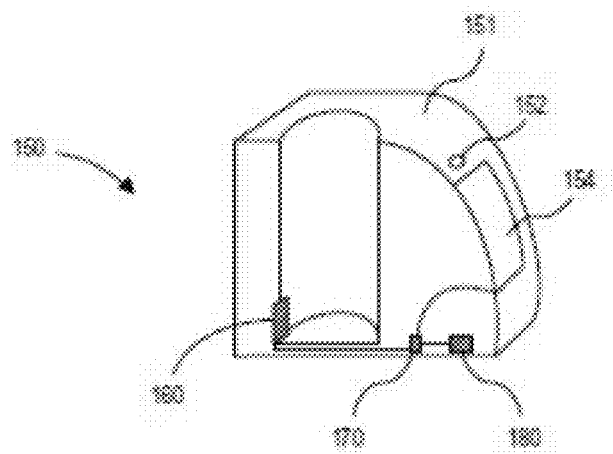

Referring to FIG. 3A, caddy 150 is shown in perspective side view, in which caddy case 151, indicator 152, and display panel 154 are also shown. FIG. 3B shows a cross-sectional view of caddy 150 and trigger 160, which are electronically connected to processing device 170, which is connected to and powered by power source 180. Processing device 170 is also electronically connected to indicator 152 and display panel 154. Trigger 160 is positioned such that it is tripped under normal operation when cleaning case 110 is placed in or on caddy 150. Tripping the trigger advances a counter within the processing device to provide a count. Positing cleaning case 110 in or on caddy 150 may also provide electrical power connections (not shown) to case 110 to power any circuitry or the alternative heating element in or on case 110. Processing device 170 and any processor may be a logic circuit, integrated circuit chip, or microprocessor, e.g., computing chip, or a plurality or combination thereof. Power source 180 may be a battery, e.g., a rechargeable battery or other type of battery typically used in small electronic devices. In some embodiments, the power source may be a power source external to the caddy, e.g., a household 110 V or similar source. A small transformer, not shown, may also be needed. In embodiments including heating element 113, it may be preferred to use an outlet source of electric power, as batteries may not provide sufficient charge to provide the necessary heating energy.

Typically, when hydrogen peroxide is introduced to cleaning case 110 containing catalyst 118, a chemical reaction occurs in which the catalyst accelerates the neutralization (i.e, reduction) of the peroxide. As described elsewhere the catalyst may be, for example and not by way of limitation, platinum or catalase. Complete neutralization of the peroxide is recommended before inserting a lens into the eye, since even trace amounts of peroxide can be very painful to the eye. The catalyzed neutralization of peroxide is an exothermic reaction. The rate and degree of temperature increase during the reaction and decrease after the reaction can be measured and will be a function of the amount of peroxide in the solution and the amount of available catalyst since catalyst material, commonly a metal such as platinum or an enzyme such as catalase, is also oxidized during the reaction. Thus, in one embodiment, changes in the temperature or temperature profile (i.e., the shape of a temperature vs. time curve) of the cleaning solution can be correlated to changes in the quality of the cleaning solution (e.g., peroxide concentrations) or the catalyst (how much catalyst is still available). A processing device can then be programmed to compare the temperature or temperature profile with a preset value. Thus, different messages can be displayed on the display device depending on whether the temperature sensor measures a temperature profile that falls within or outside of the acceptable temperature profile range. Further details of systems and methods for monitoring the reaction rate and disinfecting efficacy based on temperature and other reaction properties (e.g., pressure) measurements can be found in commonly owned U.S. patent application Ser. No. 13/403,754 (now U.S. Pat. No. 8,851,091), and for sake of brevity will not be further described herein.

Figure 4:
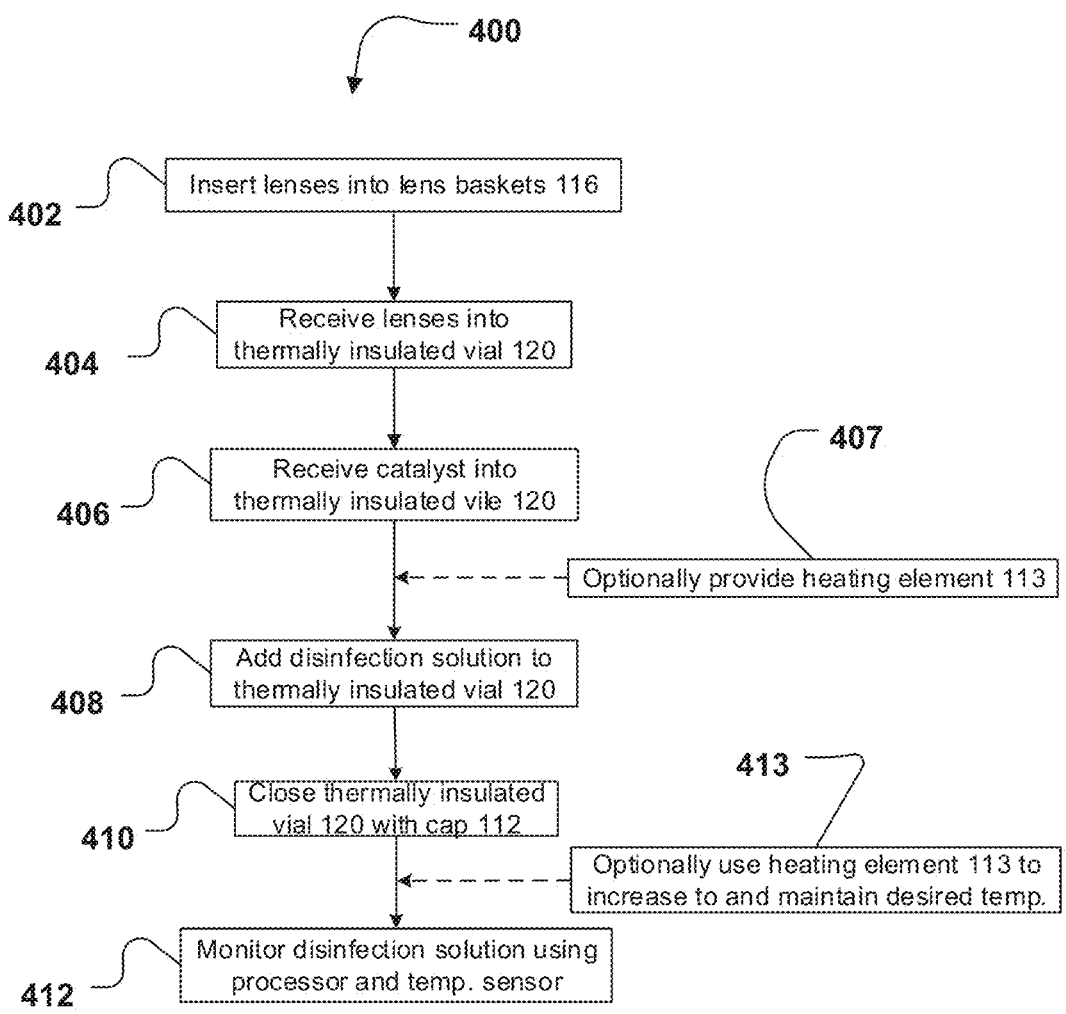
FIG. 4 illustrates an exemplary operation flowchart.
Figure 5:
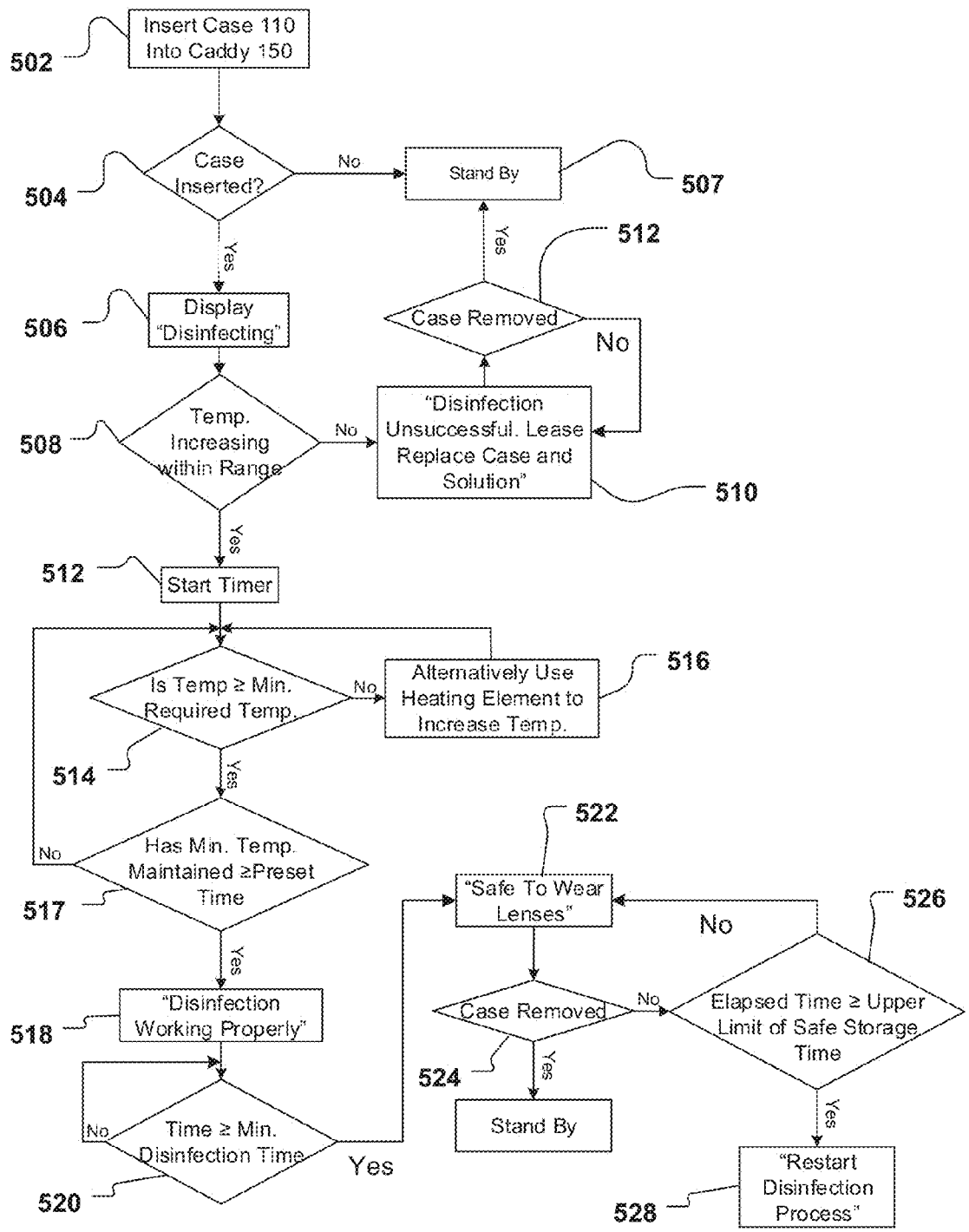
FIG. 5 illustrates another exemplary operational flowchart.

Referring to FIGS. 4-5, various aspects of operation of certain embodiments of a contact lens disinfection system and method 400 are provided. At step 402 a user inserts the lenses into baskets 116. The baskets with lenses are then placed into thermally insulated vial at step 404, and a catalyst is also inserted at step 406. The skilled artisan will appreciate that the catalyst may be integrated into the basket structure, as in catalyst 118 on case 110, or it may be provided in any other manner known to the skilled artisan (e.g., dropping catalyst into vial, making catalyst part of the vial, etc.). Disinfection solution is added to thermally insulated vial 120 at step 408. But, it will be appreciated that the disinfection solution may be added to the vial prior to receiving the contact lenses and catalyst, and that the order of the method is not particularly important, except to note that the catalyst should contact the disinfection solution at approximately the same time or shortly after the lenses are immersed in the disinfection solution, otherwise the catalyzed neutralization will diminish the disinfection properties (e.g., lower peroxide concentrations) of the solution prior to insertion of the lenses. Cap 112 is secured to thermally insulated vial at step 410.

Referring now to FIG. 5, case 110 is inserted into/onto caddy 15 at step 502. A trigger (e.g., trigger 160, FIG. 3B) and the processing device to which it is connected can be used to determine if the contact lens case has been placed into the base unit at step 504. If a cleaning case has been placed therein, a message such as "Disinfecting" can be displayed on a display panel (e.g., display panel 154, FIG. 1A) at step 506. If no cleaning case has been placed in the base unit, the display panel can display a message such as "Standing By" at step 507 and the base unit can be said to be in "standby mode". After the trigger has been tripped, the temperature profile of the disinfection solution can be measured to determine if it falls within an acceptable temperature profile range at step 508, meaning that a sufficient temperature (or pressure or other reaction property) increase with respect to time is measured to assure that the disinfection solution is sufficiently strong or the catalyst is sufficiently active to assure disinfection. If "No" then a message such as "Disinfection unsuccessful. Please replace case and solution." can be displayed at step 510, after which the case can be removed at step 512 and the "Standing By" message can be displayed at step 507. If the temperature is found to be increasing within an acceptable range, then a timer can begin counting to a preset minimum disinfection time ("MDT") time for normal disinfection of a pair of contact lenses at step 512. At step 514 the method determines if the desired temperature is reached to achieve increased kill rates (as described herein). If such minimum temperature not reached, the method alternatively activates heating element 113 to elevate temperature to minimum at step 516. The temperature is preferably checked over time to ensure the minimum temperature is maintained or exceeded for a preset time at step 517. At this time, a "Disinfection working properly" message can be displayed at step 518. This message can remain displayed as long as long as the elapsed time is not greater than the minimum disinfection time and the temperature did not drop below the minimum temperature for the preset amount of time at step 520. The preset amount of time will be determined based on the time needed to achieve increased kill rates. It will be appreciated that the time to achieve increased kill rates at elevated temperatures will be less than the amount of time to achieve full neutralization. Once the elapsed time ("ET") equals the minimum time to achieve a neutralized solution at step 520, a "Safe to Wear Lenses" or "Disinfection Complete" message may be displayed at step 522. For example, the minimum disinfection time can be set at 6 hours. Other minimum disinfection times can be set according to factors such as how long it takes to measure the temperature profile, the size and shape of the lens case and catalyst, and the recommended minimum time of disinfection specified by the cleaning system (e.g., CLEAR CARE®, etc.), etc. If the case is then removed at step 512, the base unit is returned to standby mode. If the case is not removed at step 524, then the timer continues to count. When the elapsed time measured by the timer reaches a preset upper limit of safe storage time ("SST") at step 526, a message such as "Please restart the disinfection process" can be displayed at step 528; if not, the "Safe to Wear Lenses" message can remain displayed. For example, the upper limit of SST may be about 18 hours, about 24 hours, about 7 days, or another time depending on the cleaning system used. Since after this time the risk of re-infection may increase, it may be advisable to remove the lenses from the cleaning case before this time. As will be appreciated by persons having ordinary skill in the art, the processing device, which can include one or more memory units, can store the values such as the elapsed time, the safe storage time, etc. and can perform the above-described comparisons and calculations.

Figure 6A:
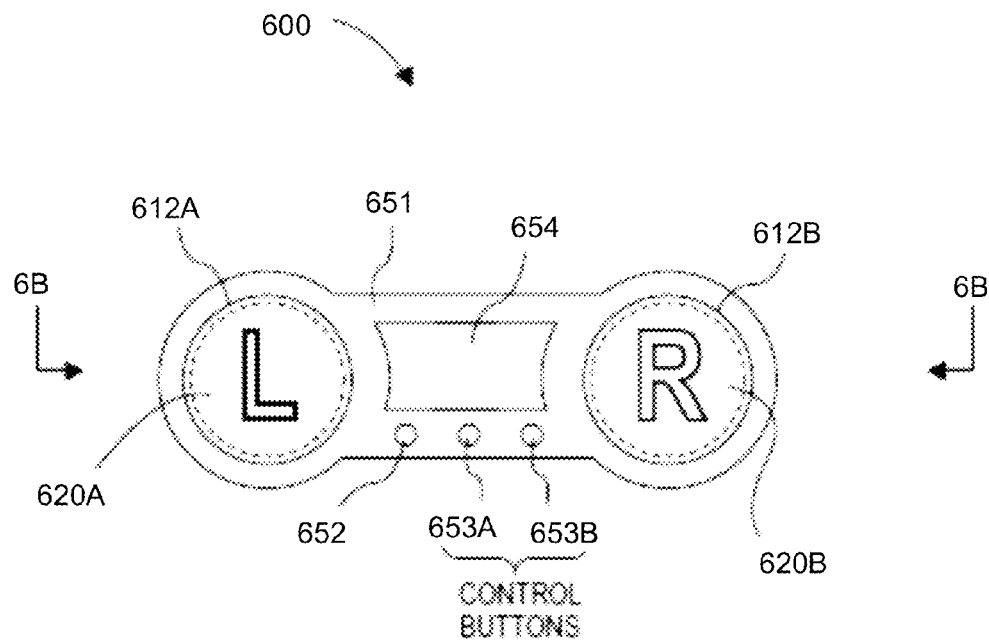
FIGS. 6A-6B illustrate a top view and a side view, respectively, of another contact lens storage system.
Figure 6B:
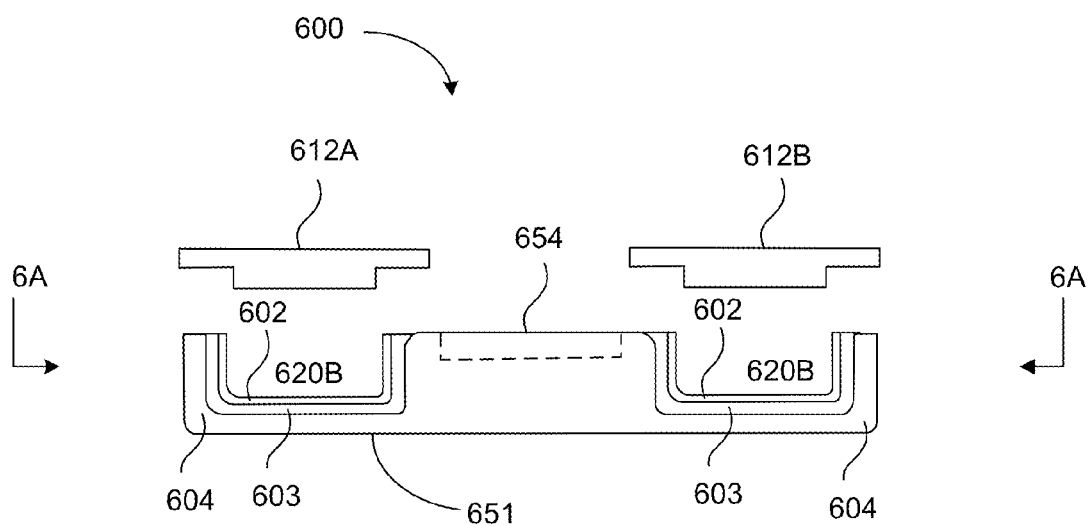

Referring to FIGS. 6A-B, an embodiment where the caddy itself receives the cleaning solution (i.e., where there is no separate cleaning case) is shown. Referring to FIG. 6A, caddy 600 in top view is shown, including thermally insulated caddy case 651, made of plastic or some other suitable material described in more detail herein, indicator 652, control buttons 653A and 653B, display 654, reservoirs 620A and 620B, and caps 612A and 612B, which may be reversibly affixed (e.g. by screwing, snapping, form-fitting, friction fitting, etc.) to thermally insulated caddy case 651. Certain of these components are shown in side view in FIG. 6B. Referring only to reservoir 620A side and FIG. 6B, insulated caddy case has internal wall 602, external wall 604, with void 603 therebetween. As will be appreciated by the skilled artisan, thermally insulated caddy case 651 and reservoirs 620A and 620B are the equivalent to thermally insulated vial 120 described above, and may have a similar double walled construction with void 603 serving to insulate, or may be constructed of insulating material, a combination of both, or may be an evacuated insulation material sandwich structure described herein. A heating element may also be provided (not shown) in this embodiment, either alone or in combination with insulating the reservoirs.

This caddy may include features illustrated in the other embodiments, and not explicitly shown here, such as a trigger, a timer, a processing device or a power source. The caddy shown in FIGS. 6A-B may also include sensors such as a temperature sensor, an electronic sensor, a pressure sensor, a sound sensor, or a gas sensor. For example, caddy 800 may include a temperature sensor in caps 612A-B. These sensors may, among other things, be used to determine the progress of disinfection and neutralization as more thoroughly described in co-owned U.S. Pat. No. 8,851,091, and may be used to ensure temperatures are adequately elevated for specified periods of time to achieve increased kill rates as described herein. The caddy may also include buttons or tabs under a portion of where the caps are placed which are depressed when the caps have been reversibly affixed to the case. When depressed, a signal can then be sent to the processing device to begin a timer or display a message, similar to the trigger described above.

Figure 7A:
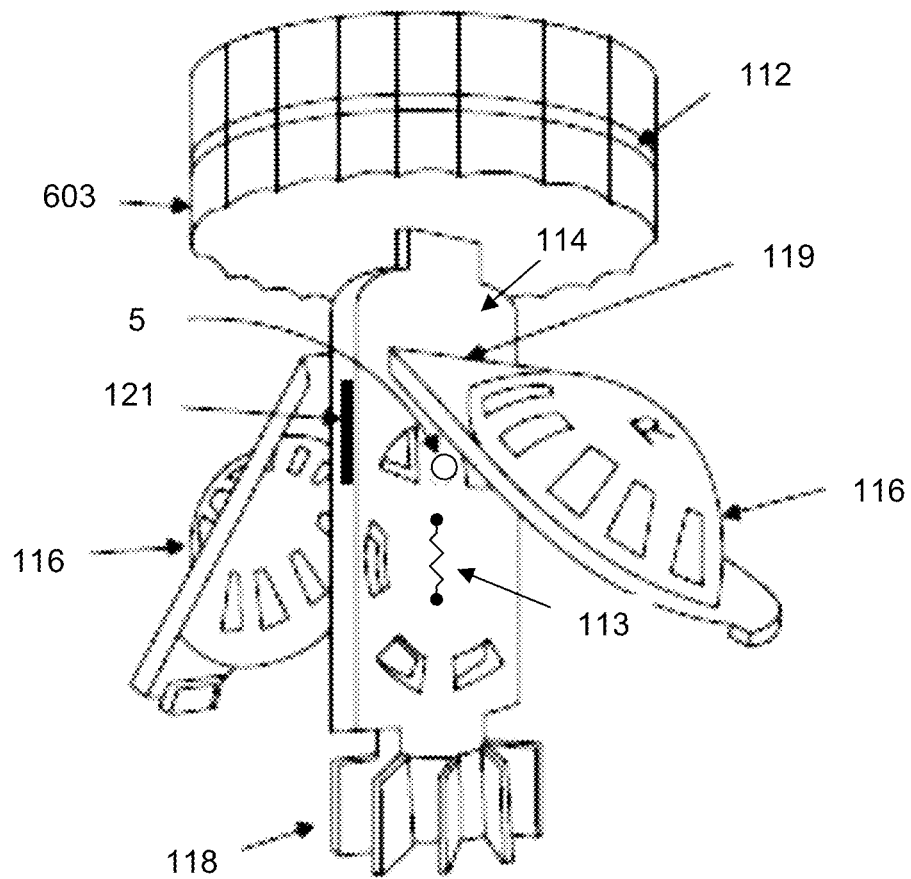
FIG. 7A illustrates a side view of the contact lens cap, lens basket, and platinum catalyst.
Figure 7B:
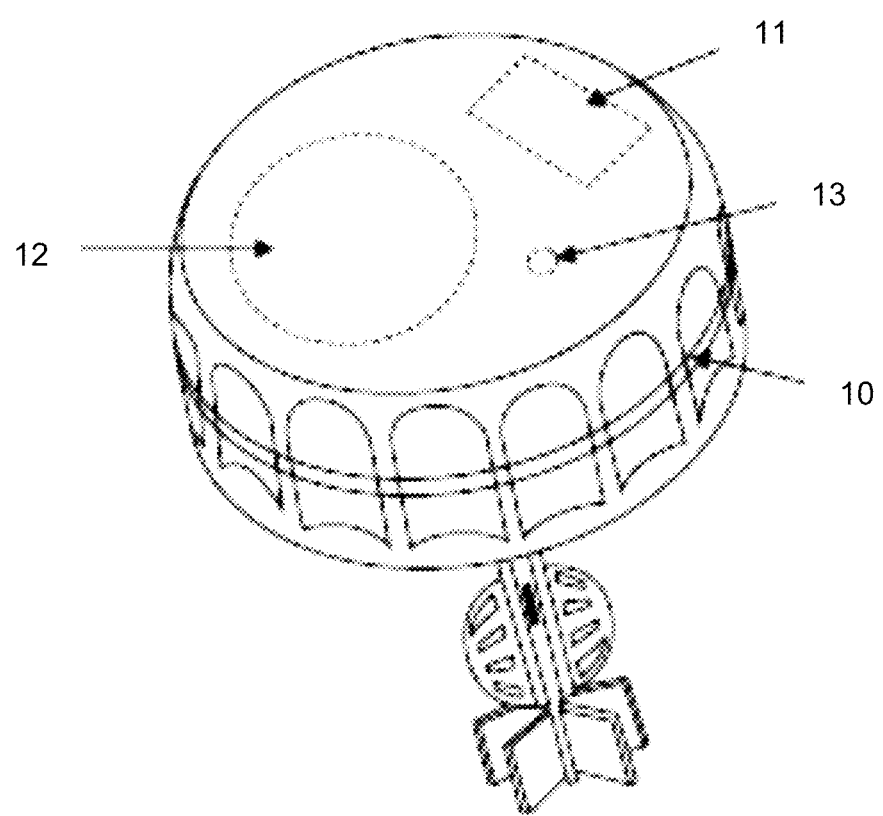
FIG. 7B illustrates a top perspective view of the contact lens cap showing the main internal components.

FIG. 7A-B illustrates a side view of case 110, including contact lens cap 112, lens basket 116, and platinum catalyst 118, though vial 120 is not shown. Vial 120 (not shown) uses threads to secure lens cap 112 to vial 120. Solution temperature sensor 5 monitors the temperature of the solution over time during the peroxide neutralization process. Heating element 113 may be provided on beam 114 or directly in vial 120 (not shown). Preferably, if provided, heating element 113 will be on beam 114 and be electrically connected to caddy 150 via wiring (not shown) in lens cap 112. The electrical connection to the heating element is provided by way of example, not limitation. The skilled artisan will appreciate many ways to electrically power the heating element without exceeding the boundaries of the present invention. In various embodiments, the solution temperature sensor 5 may be a thermistor or a thermocouple. Using a solution sensor 121, the microcontroller (not shown) senses that the contact lenses are immersed into the disinfection solution and initiates the monitoring process. The solution sensor 121 may include two electrodes, one of which is shown on support beam 114 of FIG. 7. Solution sensor 121 may be located adjacent or near a top portion of lens basket 116. The solution sensor may be a pair of conductivity electrodes.

A pair of contact lens baskets 116 holds the lenses in place during the disinfection process. Platinum catalyst 118 neutralizes the hydrogen peroxide solution, an exothermic process. The basket hinge 119 allows the contact lens basket 7 to open, which allows the contacts to be attached or removed.

FIG. 7B illustrates a top view of lens cap 112 showing some internal components. These may include a microcontroller 11, a sensor such as an external temperature sensor 13, a battery 12, or other electrical power source (e.g., connection to the caddy or alternatively a DC or AC source). The capacitive touch sensor 10 wakes the microcontroller 11 from low-power sleep mode. The capacitive touch sensor 10, commonly used in many hand-held devices such as cell phone capacitive touch screens, may communicate with the microcontroller 11 to identify hand touch.

The external temperature sensor 13 measures the temperature of the air around the cup 1 and corrects for external heating or cooling of the solution. In various embodiments, the external temperature sensor 13 may be a thermistor or a thermocouple. An example how the microcontroller 11 may measure temperature through the use of a thermistor, is with the use of an RC circuit. These temperatures can be used by the microcontroller to determine when disinfection and neutralization are complete when combined with temperature data from inside the vial during disinfection and neutralization. These processes are described more thoroughly in co-owned U.S. Pat. No. 8,851,091.

Increased Kill Rates of Microorganisms at Elevated Temperatures in a Peroxide System Kill rates of commonly known microorganisms on contact lenses in a peroxide system are increased at elevated temperatures as illustrated by the data below and graphical representation thereof in FIG. 8A-B In the first test, 0.05% $H_2O_2$ was tested against *Aspergillus brasiliensis* ATCC 16404 at varying temperatures to determine if temperatures affect the kill rate in the presence of peroxide. 3% $H_2O_2$ was diluted into phosphate buffered saline and immediately inoculated with 5 loopfuls of *A. brasiliensis* spores. 1 mL aliquots were added to microcentrifuge tubes and incubated at room temperature, 30° C., 40° C. and 50° C. for time intervals of 0.5, 1 and 3 hours. Controls without $H_2O_2$ were also tested. *A. brasiliensis* spore stock was prepared to achieve approximately $1 \times 10^6$ CFU/mL, confirmed by bactiter. At each time point, 100 μL was removed, diluted and spread on to SDA plates (triplicate). The plates were then incubated in 30° C. for optimal growth.

Figure 8A:
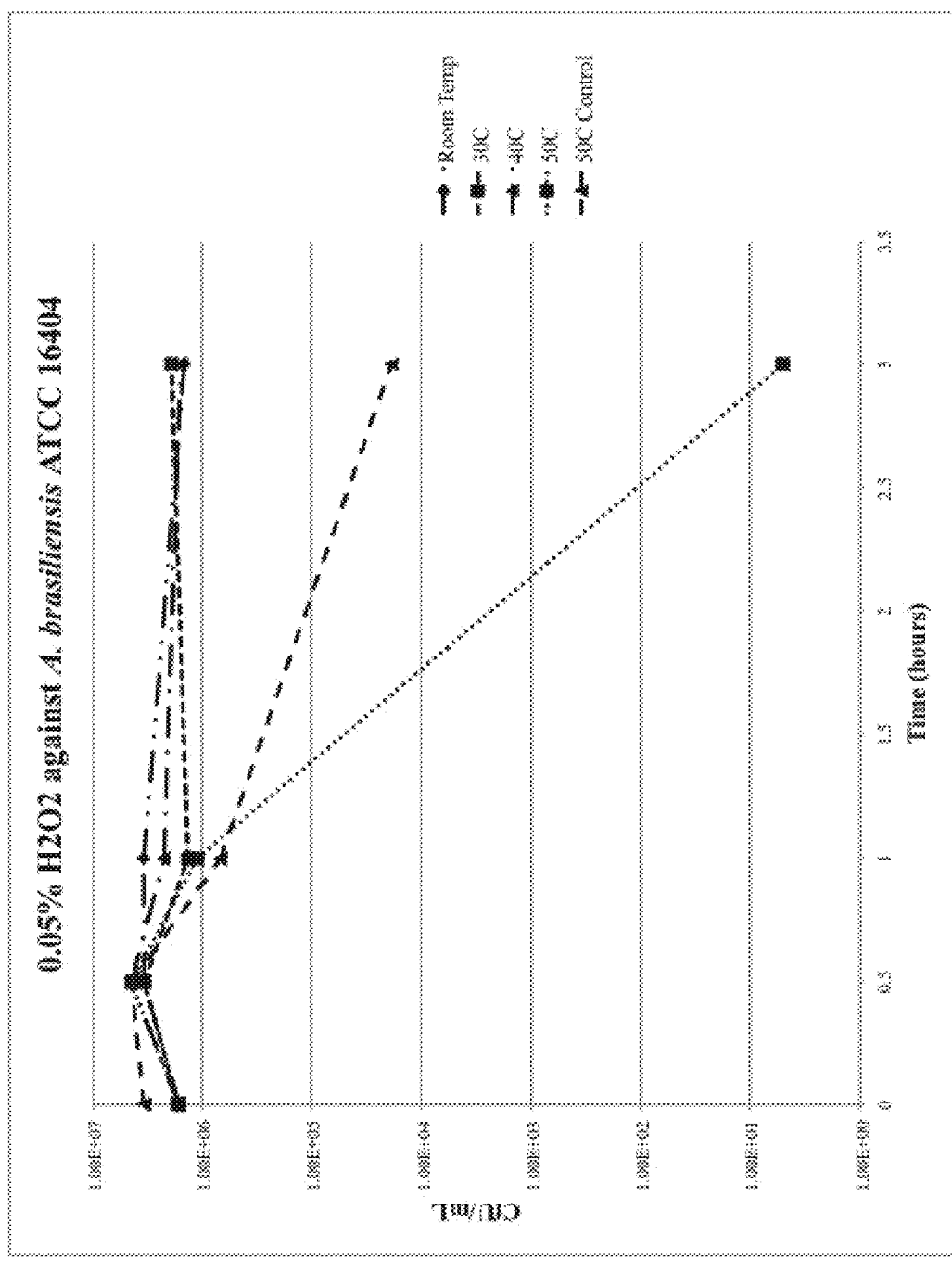
FIG. 8A-B illustrates kill rate for *C albicans* and *A. brasiliensis* in peroxide over a range of temperatures.

Table 1 and FIG. 8A show increased kill rate for *A. brasiliensis* in 0.05% $H_2O_2$ with elevated temperature in the presence of peroxide. Complete kill (down to the limit of detection) was achieved by 3 hours at 50° C. It is noted that there is a reduction of CFUs in the control by 3 hours at 50° C. (Table 2).

TABLE 1

*A. brasiliensis* in 0.05% $H_2O_2$

| Hours | Room Temp. | 30° C. | 40° C. | 50° C. |
|---|---|---|---|---|
| 0 | $1.67 \times 10^6$ | $1.67 \times 10^6$ | $1.67 \times 10^6$ | $1.67 \times 10^6$ |
| 0.5 | $3.33 \times 10^6$ | $3.33 \times 10^6$ | $4.44 \times 10^6$ | $4.44 \times 10^6$ |
| 1 | $3.33 \times 10^6$ | $1.33 \times 10^6$ | $2.22 \times 10^6$ | $1.11 \times 10^6$ |
| 3 | $1.44 \times 10^6$ | $1.89 \times 10^6$ | $1.56 \times 10^6$ | ≤5 |

TABLE 2

*A. brasiliensis* grown in control

| Hours | 50° C. |
|---|---|
| 0 | $3.33 \times 10^6$ |
| 0.5 | $4.44 \times 10^6$ |
| 1 | $6.67 \times 10^5$ |
| 3 | $1.89 \times 10^4$ |

In a second test, 0.01% H2O2 was tested against *Candida albicans* ATCC 10231 at varying temperatures to determine if temperatures affect the kill rate in the presence of peroxide. 3% H2O2 was diluted into sterile saline and 0.5 mL aliquots added to microcentrifuge tubes. Controls without H2O2 were also tested. *C. albicans* stock was prepared and inoculated into each microcentrifuge tube to achieve approximately 1×105 CFU/mL, confirmed by bactiter. The tubes were incubated at room temperature, 30° C., 40° C. and 50° C. for time intervals of 0.5, 1 and 3 hours. At each time point, 100 uL was removed, diluted and spread on to SDA plates. The plates were then incubated in 30° C. for 2 days for optimal growth. This was performed in duplicate. It is noted that 50° C. plates contained no viable *C. albicans* colonies in either the testing agent or the control plates at all time points (Tables 3 and 4). It is therefore concluded that *C. albicans* does not survive 50° C. incubation period.

Figure 8B:
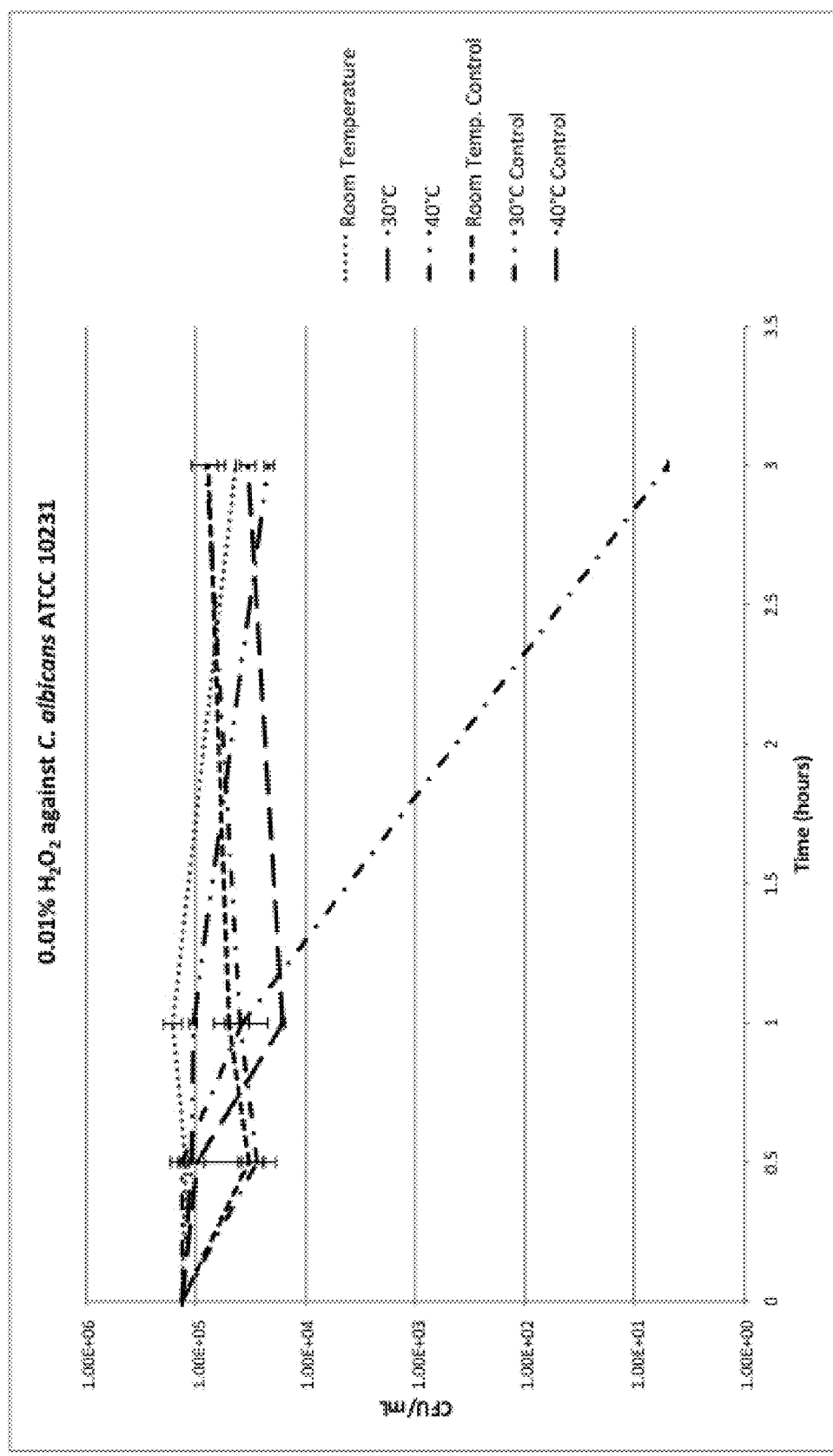

Tables 3, 4 and FIG. 8B show increased kill rate of *C. albicans* in 0.01% H2O2 at elevated temperatures. Complete kill (down to the limit of detection) was achieved by 3 hours at 40° C.

TABLE 3

*C. albicans* (average CFU/mL) in 0.01% $H_2O_2$

| Hours | Room Temp. | 30° C. | 40° C. | 50° C. |
|---|---|---|---|---|
| 0 | $1.33 \times 10^5$ | $1.33 \times 10^5$ | $1.33 \times 10^5$ | $1.33 \times 10^5$ |
| 0.5 | $1.22 \times 10^5$ | $1.11 \times 10^5$ | $1.34 \times 10^5$ | >5 |
| 1 | $1.64 \times 10^5$ | $1.07 \times 10^5$ | $3.78 \times 10^4$ | >5 |
| 3 | $4.33 \times 10^4$ | $2.17 \times 10^5$ | >5 | >5 |

TABLE 4

*C. albicans* (average CFU/mL) grown in control

| Hours | Room Temp. | 30° C. | 40° C. | 50° C. |
|---|---|---|---|---|
| 0 | $1.33 \times 10^5$ | $1.33 \times 10^5$ | $1.33 \times 10^5$ | $1.33 \times 10^5$ |
| 0.5 | $3.28 \times 10^4$ | $2.78 \times 10^4$ | $9.56 \times 10^4$ | >5 |
| 1 | $5.00 \times 10^4$ | $3.89 \times 10^4$ | $1.61 \times 10^4$ | >5 |
| 3 | $7.78 \times 10^4$ | $8.06 \times 10^4$ | $3.39 \times 10^4$ | >5 |

These data clearly demonstrate an increased kill rate for at least two fungal species in the presence of hydrogen peroxide at elevated temperatures.

Figure 9:
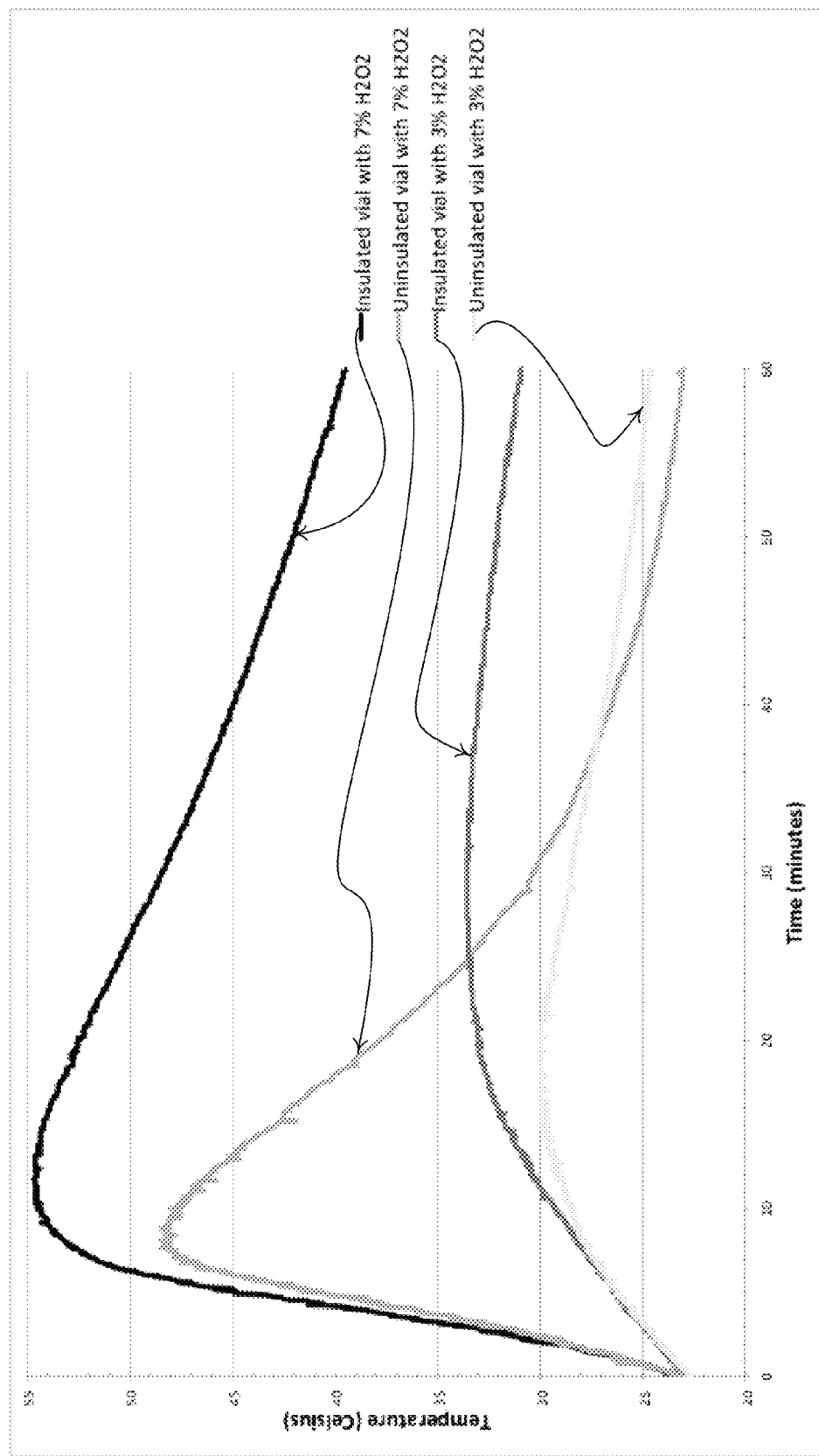
FIG. 9 illustrates heat retention characteristics for an insulated vial in accordance with an embodiment of the present invention.

Temperature Profiles of Peroxide Solution with Platinum in Thermally Insulated Vial FIG. 9 shows plots of temperature versus time of thermally insulated vials in accordance with embodiments of the present invention. The thermally insulated vials were of dual walled plastic construction with the void filled with expanded polyurethane foam, but not evacuated. The wall thickness, including the expanded polyurethane foam, was approximately 2 cm. Also shown are plots of temperature versus time for an uninsulated vials. The system tested was 3% and 7% peroxide solutions in the presence of a platinum catalyst. The data demonstrated the heat from the exothermic reaction increased the temperature of the peroxide solutions. The peak temperature reached in the insulated vials was higher than in the uninsulated vials, and the temperature of the insulated vials remained higher than in the uninsulated vials. These data strongly suggest that the idea of using a thermally insulated vial will provide a mechanism for achieving and maintaining an elevated temperature in the peroxide solution solely based on heat from the exothermic neutralization reaction.

Figure 10:
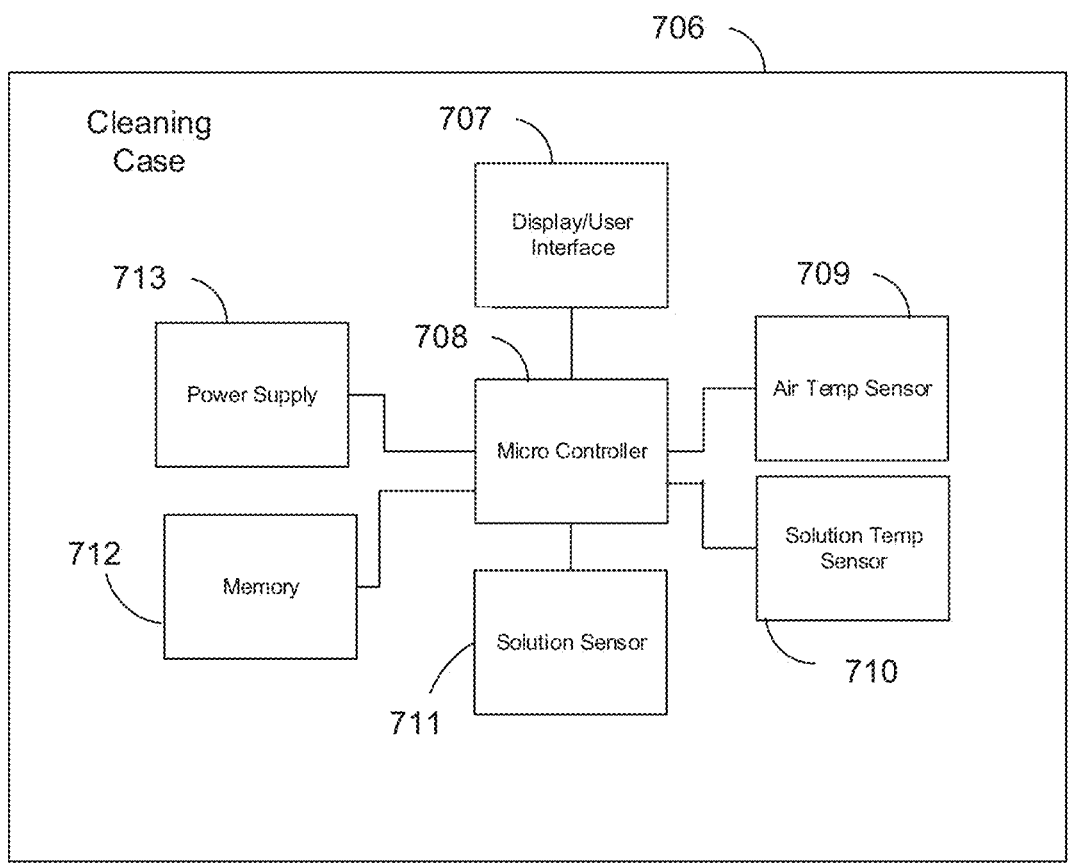
FIG. 10 illustrates a block diagram of an exemplary temperature sensing contact lens cleaning case.

FIG. 10 illustrates a block diagram of an exemplary temperature sensing contact lens cleaning case 706. The cleaning case 706 has a microcontroller 708 that is powered by the power supply 713. The microcontroller 708 monitors the solution sensor 711 to sense when solution is present. When the microcontroller 708 determines that solution is present, readings from air temperature sensor 709 and solution temperature sensor 710 are obtained. These readings, combined with calibration data stored in the memory 712, are converted to temperature measurements by the microcontroller 708. The microcontroller 708 then stores these historical temperature measurements in the memory 712 for later retrieval. After a specific duration, the temperature measurements are recalled from the memory 712 by the microcontroller 708. The microcontroller 708 determines what signals should be sent to display 707.

Figure 11A:
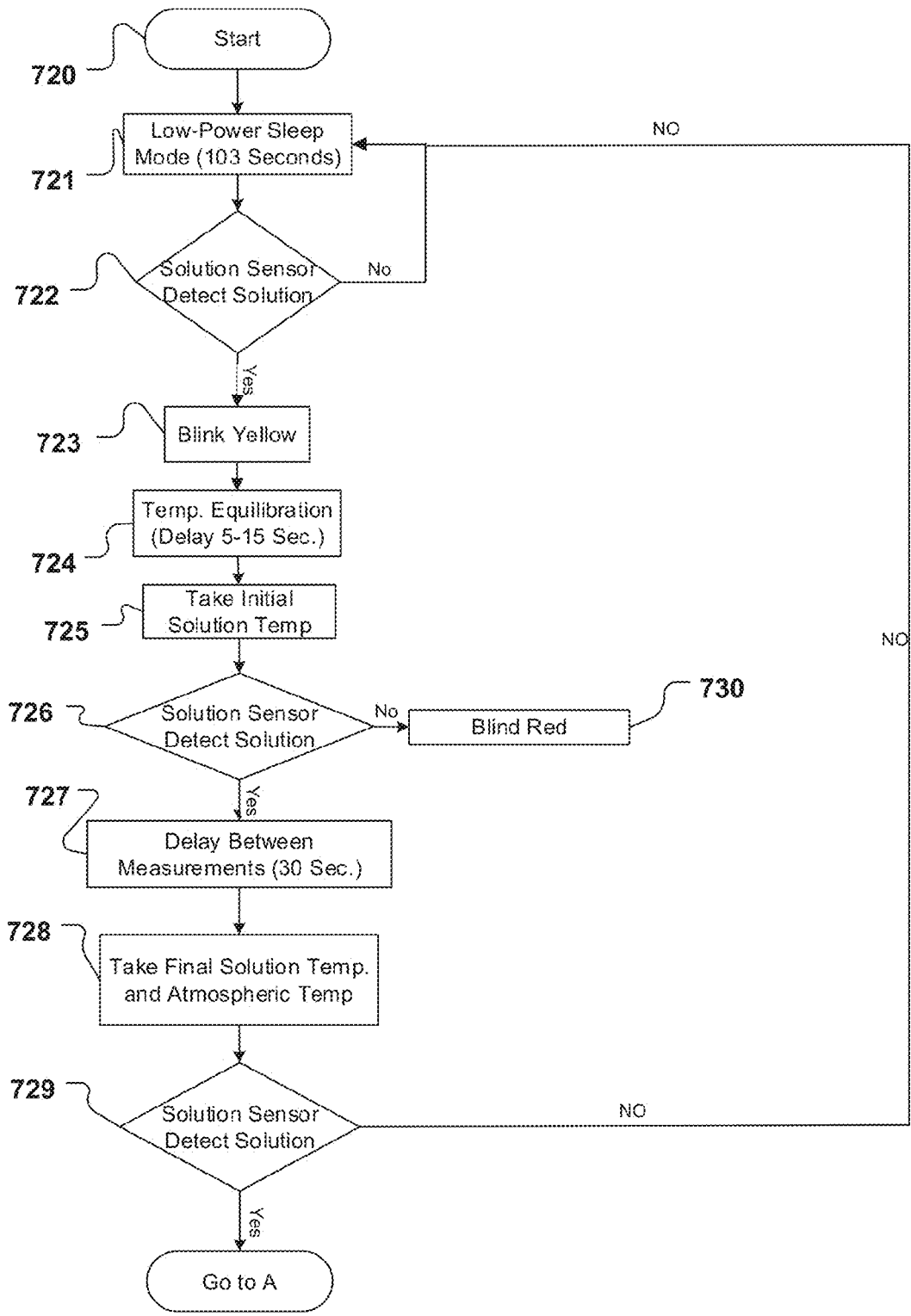
FIGS. 11A-B illustrates another exemplary operational flowchart.
Figure 11B:
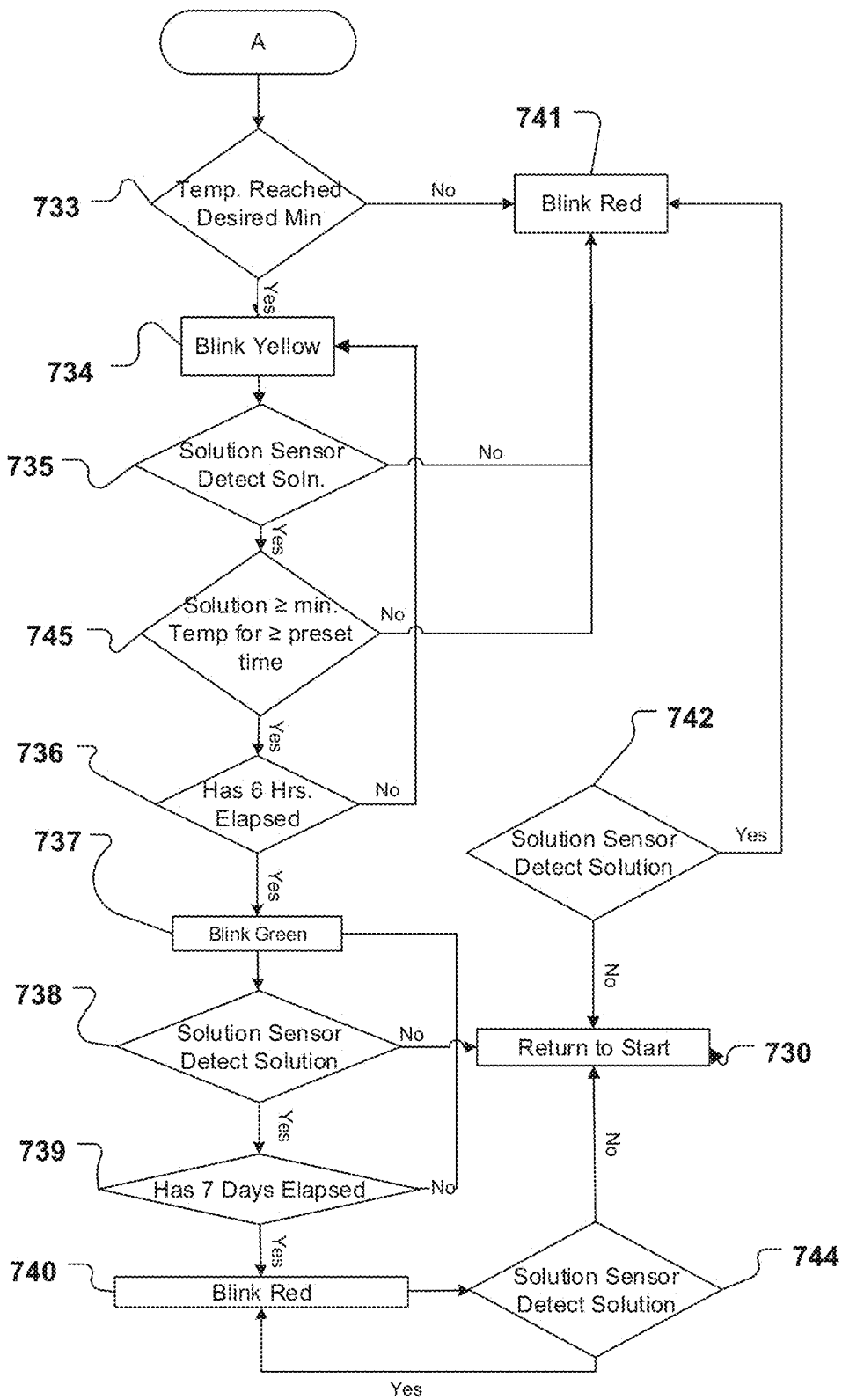

FIGS. 11A-B illustrates an example of an operational flow chart for using a three light LED display configuration. The flow of operation described herein is for illustrative purposes and is not intended to be limiting. In various embodiments, the process begins at step 720 when the cleaning case (e.g. case 110 with thermally insulated vial 120) is powered on.

In some embodiments, the device is normally in low-power sleep mode at step 721 to preserve limited battery life, though AC power may alternatively be provided. The device may wake up from low-power sleep mode every 1 to 3 seconds for a period of a few microseconds to sense if cleaning solution has been added to the device at step 722. If no solution is detected, the device goes back into sleep mode. If solution is detected, the device blinks the yellow LED quickly at step 723. For example, the device LED may blink twice per second. Quick blinking may indicate the device is determining if the cleaning solution and system are functioning properly. The device delays 5 to 15 seconds before taking a baseline temperature measurement at step 724, to allow for temperature equilibration of the cleaning solution, vial, and cap. After equilibration, initial solution and atmospheric temperature measurements are taken at step 725. The solution temperature is used as a reference point, from which future solution temperature rates can be determined. The device routinely detects if the cap is continuously immersed in solution at step 726.

If no solution is detected at step 726, the LED will blink red at step 730, indicating that the cleaning process has been interrupted and that it is unsafe to place the contact lenses into the eye. The red blinking LED continues to blink for 30 seconds, followed by return to low-power sleep mode at the start of the sequence. If solution is detected, the microcontroller delays for 30 seconds at step 727. Solution and atmospheric temperature measurements are re-sampled or taken at step 728. The device routinely detects if the cap is continuously immersed in solution at step 729, and the process proceeds if solution is detected.

Referring to FIG. 11B, if the actual temperature has reached the desired minimum temperature (e.g. 40° C.) at step 733, then the device blinks the yellow LED slowly at step 734, for example once per 2 to 3 seconds. The purpose of the slowly blinking is to indicate that the device has determined that the cleaning solution and system are functioning properly, and the device is cleaning the contact lenses. The device detects if the cap is continuously immersed in solution at step 735. If solution is detected, the device proceeds to determine if the temperature is at or above the minimum temperature for a preset period of time at step 745. If both steps 735 and 745 are true, then the device goes on to allow 6 hours (or a preset period of time) for the cleaning solution to complete the cleaning/neutralization cycle at step 736. If either 735 or 745 are false the device blinks red indicating an error has occurred, and step 742 will check to see if a solution remains present and continue to blink red until the solution is removed returning the system back to start. If 6 hours has elapsed, the device blinks the green LED slowly at step 737, which indicates to the user that the device has finished the cleaning/neutralization cycle, and the contact lenses are safe to insert into the eye. The device continues to blink the green LED until no solution is detected at step 738 (user removed lenses, dumped solution), where it returns to the start at step 743. If solution continues to be detected at step 738, and 7 days (for example) has elapsed at step 739, then the LED blinks red at step 740 to indicate that it is no longer safe to insert the contact lenses into the eye. This is due to a possibility that microbes may have re-infected the sterile solution. The red LED will continue to blink until no solution is detected at step 744.

The examples above describe in detail embodiments in which the vial or vessel into which the lenses are placed is thermally insulated to retain heat from the exothermic peroxide neutralization, where the insulation is used to achieve and maintain an elevated temperature of the disinfection solution so as to increase the kill rate of microorganisms present on the lenses. However, this disclosure encompasses additional embodiments wherein other ways of insulating and/or increasing and maintaining an elevated temperature may be used. Such as, for example and without limitation, a heating element, or an evacuated sandwich structure.

While a number of exemplary embodiments, aspects and variations have been provided herein, those of skill in the art will recognize certain modifications, permutations, additions and combinations and certain sub-combinations of the embodiments, aspects and variations. It is intended that the following claims are interpreted to include all such modifications, permutations, additions and combinations and certain sub-combinations of the embodiments, aspects and variations are within their scope.

What is claimed is:

1. A thermally insulated contact lens disinfection system comprising:
   a contact lens holder;
   a vial adapted to contain the contact lens holder and a disinfection solution, wherein a catalyst is capable of neutralizing the disinfection solution; and
   a thermal insulation layer surrounding and integral with the vial, whereby the thermal insulation layer reduces heat loss from the vial resulting in an increased temperature of the disinfection solution.

2. The thermally insulated contact lens disinfecting system according to claim 1, wherein the thermal insulation layer is a volume between an internal wall of the vial and an external wall of the vial.

3. The thermally insulated contact lens disinfecting system according to claim 2, wherein the volume is under a reduced pressure less than atmospheric pressure.

4. The thermally insulated contact lens disinfecting system according to claim 3 wherein the reduced pressure is between 0.0001 torr to 1 torr.

5. The thermally insulated contact lens disinfecting system according to claim 4, wherein the reduced pressure is between 0.1 torr-1 torr.

6. The thermally insulated contact lens disinfecting system according to claims 2, wherein the volume has a gas therein, wherein the gas has a thermal conductivity less than that of air.

7. The thermally insulated contact lens disinfecting system according to claim 6, wherein the gas is a mixture of gases.

8. The thermally insulated contact lens disinfecting system according to claim 2, wherein the volume has a mixture of gases therein, and the mixture of gases is air.

9. The thermally insulated contact lens disinfection system according to claim 2, wherein a thermally insulating material is sandwiched in the volume between the internal wall and the external wall.

10. The thermally insulated contact lens disinfecting system according to claim 9, wherein the thermally insulating material comprises one or more materials selected from the group consisting of neoprene rubber, silica aerogel, expanded polystyrene, polyurethane foam, fiberglass, and mineral wool.

11. The thermally insulated contact lens disinfection system according to claim 10, wherein the volume is under a reduced less than atmospheric pressure.

12. The thermally insulated contact lens disinfection system according to claim 11, wherein the volume is under a reduced pressure of about 0.0001torr to 1 torr.

13. The thermally insulated contact lens disinfection system according to claim 12, wherein the reduced pressure is about 0.1 torr-1 torr.

14. The thermally insulated contact lens disinfecting system according to claim 1, wherein the walls of the vial and the thermal insulation layer are the same and constructed from material have a thermal conductivity between 0.0001 W/mK-0.05 W/mK.

15. The thermally insulated contact lens disinfecting system according to claim 1, wherein the walls of the vial and the thermal insulation layer are the same and constructed from a thermally insulating material selected from the group consisting of polystyrene, polypropylene, poly (styrene butadiene), poly(acrylonitrile butadiene styrene), polypropylene, or poly(methyl methacrylate).

16. The thermally insulated contact lens disinfecting system according to claim 1 further comprising:
- a sensor capable of providing temperature of the disinfection solution;
- a processing device in communication with the sensor to receive the temperature data from the sensor; and
- a display in communication with the processing device, the processing device being adapted to operate the display to provide disinfecting efficacy information based on the temperature data.

* * * * *